US012674722B2

(12) United States Patent
Landvogt et al.

(10) Patent No.: US 12,674,722 B2
(45) Date of Patent: Jul. 7, 2026

(54) ROLL TESTING MACHINE FOR ROLL TESTING TOOTHINGS

(71) Applicant: Klingelnberg AG, Zürich (CH)

(72) Inventors: Alexander Landvogt, Rheinstetten (DE); Thomas Serafin, Karlsruhe (DE)

(73) Assignee: KLINGELNBERG AG, Zürich (CH)

( * ) Notice: Subject to any disclaimer, the term of this patent is extended or adjusted under 35 U.S.C. 154(b) by 529 days.

(21) Appl. No.: 18/321,365

(22) Filed: May 22, 2023

(65) Prior Publication Data
US 2024/0295465 A1 Sep. 5, 2024

(51) Int. Cl.
G01M 13/021 (2019.01)
G01B 5/16 (2006.01)

(52) U.S. Cl.
CPC .......... G01M 13/021 (2013.01); G01B 5/166 (2013.01)

(58) Field of Classification Search
CPC .................................................. G01M 13/021
See application file for complete search history.

(56) References Cited

U.S. PATENT DOCUMENTS

| | | | | |
|---|---|---|---|---|
| 2,602,236 A | * | 7/1952 | Muller ..................... | G01B 5/20 |
| | | | | 33/501.13 |
| 2,726,455 A | | 12/1955 | Saari | |
| 2013/0019674 A1 | * | 1/2013 | Fischer .............. | G01M 13/021 |
| | | | | 73/162 |
| 2020/0225027 A1 | * | 7/2020 | Landvogt .............. | G01B 5/166 |

FOREIGN PATENT DOCUMENTS

| | | | | |
|---|---|---|---|---|
| CH | 444505 A | | 9/1967 | |
| GB | 822636 A | * | 10/1959 | .............. G01B 5/20 |
| JP | 2006153466 A | | 6/2006 | |

\* cited by examiner

*Primary Examiner* — Stephanie E Bloss
*Assistant Examiner* — Diana Hancock
(74) *Attorney, Agent, or Firm* — CANTOR COLBURN LLP

(57) ABSTRACT

A roll testing machine for roll testing toothings includes a first spindle and a second spindle, and a first master wheel, which is arranged on the first spindle. The roll testing machine allows for a more efficient testing of a shaft having two gearings by using a second master wheel, which is arranged on the first spindle.

12 Claims, 3 Drawing Sheets

ROLL TESTING MACHINE FOR ROLL TESTING TOOTHINGS

CROSS-REFERENCE TO RELATED APPLICATIONS

This application claims the benefit of German patent application no. 20 2023 101 031.8 filed on Mar. 3, 2023, the disclosure of which is incorporated herein by reference in its entirety.

TECHNICAL FIELD

The present disclosure relates to roll testing machines for roll testing toothings. Furthermore, the present disclosure relates to a method for roll testing toothings and a master gearwheel arrangement.

BACKGROUND

In electromobility, vehicles are equipped with a hybrid drive or a solely electric-motor drive, wherein the drive power of at least one electric motor is used to drive the relevant vehicle. To operate the relevant electric motor as efficiently as possible, gear drives are arranged between the electric motor and an axle differential of a wheel axle of the vehicle to be driven.

Thus, for example, transmitting an output speed and an output torque of an output shaft of the electric motor by means of a first spur gear step to an intermediate shaft and transmitting them from the intermediate shaft by means of a second spur gear step to the axle differential is known. A step-down transmission typically takes place here, since electric motors operate efficiently at higher speeds.

Therefore, two gear wheels of different diameters are arranged on the above-mentioned intermediate shaft, for example, external helical-toothed spur gears, in order to transmit the output of the electric motor from the output shaft of the electric motor to the axle differential of the vehicle.

After the production of the gear wheels of the intermediate shaft, these gear wheels have to be checked with respect to compliance with predetermined quality criteria. For this purpose, subjecting gear wheels to roll testing is known. One gearwheel at a time is typically chucked in a roll testing machine and checked in this case. Therefore, re-clamping and changing both the relevant gearwheel to be tested and also the master wheel or master gearwheel typically to be rolled with an associated gearwheel are therefore necessary to test the gear wheels of the intermediate shaft.

SUMMARY

The present disclosure is based on the technical problem of specifying a roll testing machine, a method for roll testing, and a master gearwheel arrangement which each enable the most efficient possible testing of two gear wheels.

The above-described technical problem is achieved in each case by the features of the independent claims. Further embodiments of the disclosure result from the following description.

According to a first aspect, the disclosure relates to a roll testing machine for roll testing toothings, having a first spindle and having a second spindle, having a first master wheel which is arranged on the first spindle. The roll testing machine is distinguished in that a second master wheel is provided, which is arranged on the first spindle.

Due to the arrangement of a second master wheel on the first spindle, it is possible to test two gear wheels to be tested in succession without it being necessary to re-clamp or change a master wheel or a gearwheel to be tested. Thus, for example, two gear wheels to be tested of an intermediate shaft mentioned at the outset can be prepared jointly in one clamping process and chucked in the roll testing machine, so that rapid and efficient successive roll testing of two gear wheels is enabled. The first spindle therefore carries two master wheels simultaneously.

It is therefore possible in particular to test two gear wheels to be tested in one test cycle of the roll testing machine, wherein the gear wheels to be tested are each engaged in succession with the associated first master wheel or second master wheel.

When reference is made in the present text to a master wheel or the term "master wheel" is used, this is a gearwheel manufactured with high precision in a known manner, which has no or almost no deviations from a predetermined target geometry. It is therefore a nearly perfect gearwheel which can be used as a reference for determining deviations of the gear wheels to be tested.

The master wheel can also be referred to as a master gear or master gearwheel, wherein this term is based on the concept of the "gauge" or "testing gauge" in the meaning of a reference normal from metrology, such as measuring gauges, shape gauges, limit gauges, or the like. The terms "master wheel", "master gear", and "master gearwheel" are used synonymously in the present text.

The terms gearwheel and toothing are used synonymously in the present text. Accordingly, the terms "first gearwheel to be tested" and "first toothing to be tested" are used synonymously. Similarly, the terms "second gearwheel to be tested" and "second toothing to be tested" are used synonymously.

The first spindle can have a first shaft, wherein the first master wheel and the second master wheel are arranged, in particular clamped, on the first shaft.

The first shaft can be held detachably and exchangeably on the roll testing machine.

The first master wheel and the second master wheel can be held detachably and exchangeably on the first shaft.

The first master wheel and the second master wheel can be formed integrally or in one piece with the first shaft. Accordingly, the first and the second master wheel are in this case connected inseparably or non-detachably to the shaft. In particular, the first master wheel, the second master wheel, and the first shaft can have been worked out from solid material, i.e., from a material block. The first master wheel, the second master wheel, and the shaft can therefore be an integral, one-piece component.

It can be provided that a relative phase position of the first master wheel in relation to the second master wheel is predetermined, i.e., that a relative angular spacing of the teeth or gaps of the first master wheel to the gaps or teeth of the second master wheel is predefined. In this way, centering can be simplified, since the relative position of the teeth and gaps is previously known. If, for example, in the context of a first roll test initially the first master wheel and the first gearwheel to be tested are engaged with one another, which initially presumes centering of the first master wheel with the first gearwheel to be tested, the position of the teeth and gaps is already known for the following further roll test and the centering or engaging can take place faster.

If, for example, for a certain series of gear wheels to be tested, multiple first master wheels and second master wheels are provided, which are mounted or arranged on respective assigned first shafts, it can thus be provided that for each of these arrangements of the master wheels, the relative phase position between the first master wheel and the second master wheel is identical.

The first shaft can have a freely protruding end section, wherein the first master wheel and the second master wheel are arranged in the area of the freely protruding end section of the first shaft. When reference is made in the present case to a freely protruding end section, this means that the relevant end section does not have an end mounting, but rather extends freely protruding like a cantilever arm without further support.

A freely protruding length of the freely protruding end section can be 20 cm or less than 20 cm. The freely protruding length of the freely protruding end section can in particular be 10 cm or less than 10 cm.

The first spindle can be associated with a first drive for rotationally driving the first spindle. Alternatively or additionally, the second spindle can be associated with a second drive for rotationally driving the second spindle.

The first spindle and the second spindle can be configured to brace a master wheel accommodated on the first spindle and the second spindle and a respective assigned gearwheel to be tested against one another and to roll them with one another with a predetermined speed and a predetermined torque. It is obvious that predetermined speed and torque progressions or profiles can also be used.

The roll testing machine can have two or more controlled axes. The controlled axes are configured, in a first machine setting, to engage the first master wheel with a first gearwheel to be tested and, in a second machine setting, to engage the second master wheel with a second gearwheel to be tested. The controlled axes are therefore used to move the first spindle and the second spindle relative to one another in order to engage master wheels held on the spindles or gear wheels to be tested with one another and to test them in a corresponding test sequence by rolling the gear wheels with one another.

The controlled axes can be numerically controlled axes, wherein, for example, two or more linear axes can be provided for the translational relative movement of the spindles in relation to one another and/or wherein two or more rotational axes can be provided for the rotational relative movement of the spindles in relation to one another.

It can be provided that the second spindle has a second shaft for accommodating two toothings to be tested. The second shaft can be held detachably and exchangeably on the roll testing machine. A first toothing to be tested and a second toothing to be tested can be arranged detachably and exchangeably on the second shaft.

It can therefore be provided that the first gearwheel to be tested and the second gearwheel to be tested are arranged, in particular clamped, on the second shaft.

The roll testing machine can be configured to carry out a single-flank roll test.

The roll testing machine can be configured to carry out a double-flank roll test.

The roll testing machine can be configured to carry out a structure-borne sound test.

The roll testing machine can be configured to carry out a rotational acceleration test.

The roll testing machine can be configured to carry out helix roll testing.

A present roll testing machine can be configured, for example, to determine one or more of the following parameters or toothing deviations, in particular by means of single-flank roll testing and/or double-flank roll testing or one of the above-mentioned methods: center distance, concentricity, roll jump, roll deviation, two-ball measure, concentricity error, tooth-to-tooth amplitude (longwave and shortwave), maximum roll deviation, transmission error and dynamic backlash, noise behavior, surface flaws.

It can be provided that the two master wheels are each helical toothings and that one of the two master wheels is left-handed and that one of the two master wheels is right-handed.

It can be provided that the two gear wheels to be tested are each helical toothings and that one of the two toothings to be tested is left-handed and that one of the two toothings to be tested is right-handed.

It can be provided that both the master wheels and the gear wheels to be tested are each external helical-toothed spur gears.

According to a second aspect, the disclosure relates to a roll testing machine, configured for carrying out a method, having the following method steps: roll testing a first toothing to be tested by rolling with a first master wheel by means of a roll testing machine; roll testing a second toothing to be tested by rolling with a second master wheel by means of the roll testing machine. The roll testing machine is distinguished in that the first master wheel and the second master wheel are arranged on a first spindle of the roll testing machine and that the first toothing to be tested and the second toothing to be tested are arranged on a second spindle of the roll testing machine. In particular, the roll testing machine can have a control unit, which is configured to carry out the above-mentioned steps, in particular by means of software of the control unit.

It can be provided that the roll testing machine has two or more controlled axes, wherein the controlled axes are configured, in a first machine setting, to engage the first master wheel with a first gearwheel to be tested and, in a second machine setting, to engage the second master wheel with a second gearwheel to be tested and the roll testing of the first toothing to be tested is carried out by means of the first machine setting and the roll testing of the second toothing to be tested is carried out by means of the second machine setting. In particular, the control unit can have software for starting up the machine settings.

According to a third aspect, the disclosure relates to a master gearwheel arrangement, having a first master wheel, having a second master wheel arranged adjacent to the first master wheel, wherein the first master wheel and the second master wheel are arranged on a first shaft.

It can be provided that the two master wheels are each helical toothings and that one of the two master wheels is left-handed and that one of the two master wheels is right-handed. It can be provided that the master wheels are external helical-toothed spur gears.

The first master wheel and the second master wheel can be held detachably and exchangeably on the first shaft.

The first master wheel and the second master wheel can be formed integrally or in one piece with the first shaft. Accordingly, the first and the second master wheel are connected inseparably or non-detachably to the shaft in this case. In particular, the first master wheel, the second master wheel, and the first shaft can have been worked out from solid material, i.e., from a material block. The first master wheel, the second master wheel, and the shaft can therefore be an integral, one-piece component.

According to a fourth aspect, the disclosure relates to a method, having the following method steps: roll testing a first toothing to be tested by rolling with a first master wheel by means of a roll testing machine; roll testing a second toothing to be tested by rolling with a second master wheel by means of the roll testing machine. The method is distinguished in that the first master wheel and the second master wheel are arranged on a first spindle of the roll testing machine and the first toothing to be tested and the second toothing to be tested are arranged on a second spindle of the roll testing machine.

Due to the arrangement of the first master wheel and the second master wheel on the first spindle, the first gearwheel to be tested and the second gearwheel to be tested can be tested in succession without re-clamping. The first master wheel and the second master wheel are therefore arranged simultaneously on the first spindle. Furthermore, the first gearwheel to be tested and the second gearwheel to be tested are arranged simultaneously on the second spindle.

While, for example, the first gearwheel to be tested and the first master wheel are engaged with one another, at this point in time of the test the first gearwheel to be tested and the first master wheel are arranged on the first spindle and the second gearwheel to be tested is arranged on the second spindle. To subsequently test the second gearwheel to be tested, it therefore solely has to be engaged with the second master wheel in order to be able to begin the test.

The roll testing machine can have two or more controlled axes, wherein the controlled axes are configured, in a first machine setting, to engage the first master wheel with a first gearwheel to be tested and, in a second machine setting, to engage the second master wheel with a second toothing to be tested, wherein the roll testing of the first toothing to be tested is carried out by means of the first machine setting and the roll testing of the second toothing to be tested is carried out by means of the second machine setting.

BRIEF DESCRIPTION OF THE DRAWINGS

The disclosure is described in more detail hereinafter on the basis of a drawing illustrating exemplary embodiments. In the figures.

DETAILED DESCRIPTION OF THE DRAWINGS

Figure 1:
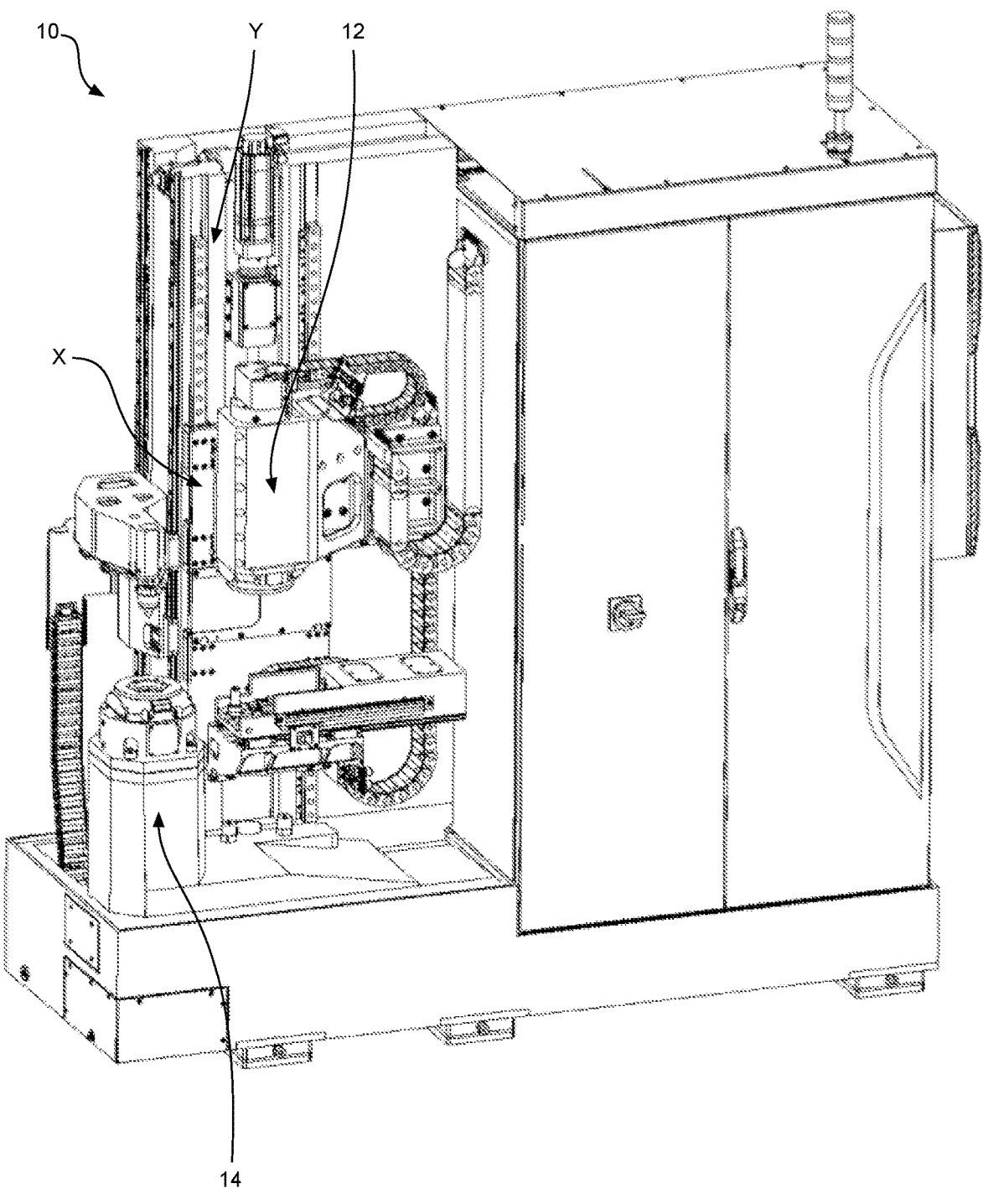
FIG. 1 shows a roll testing machine.

FIG. 1 shows a roll testing machine 10 for roll testing toothings. In this case, this is a roll testing machine from Klingelnberg, which is sold under the name "Höfler R300". The roll testing machine 10 of the type "Höfler R300" is not described with all its functionalities in the present case. The description of the roll testing machine 10 is restricted to those aspects which are relevant for the description of the disclosure.

The roll testing machine 10 has a first spindle 12 and a second spindle 14. The first spindle 12 is used to accommodate a master wheel. The second spindle 14 is used to accommodate a toothing to be tested or a gearwheel to be tested.

The roll testing machine 10 is shown without a master wheel and without a toothing to be tested in FIG. 1.

Figures 2, 3:
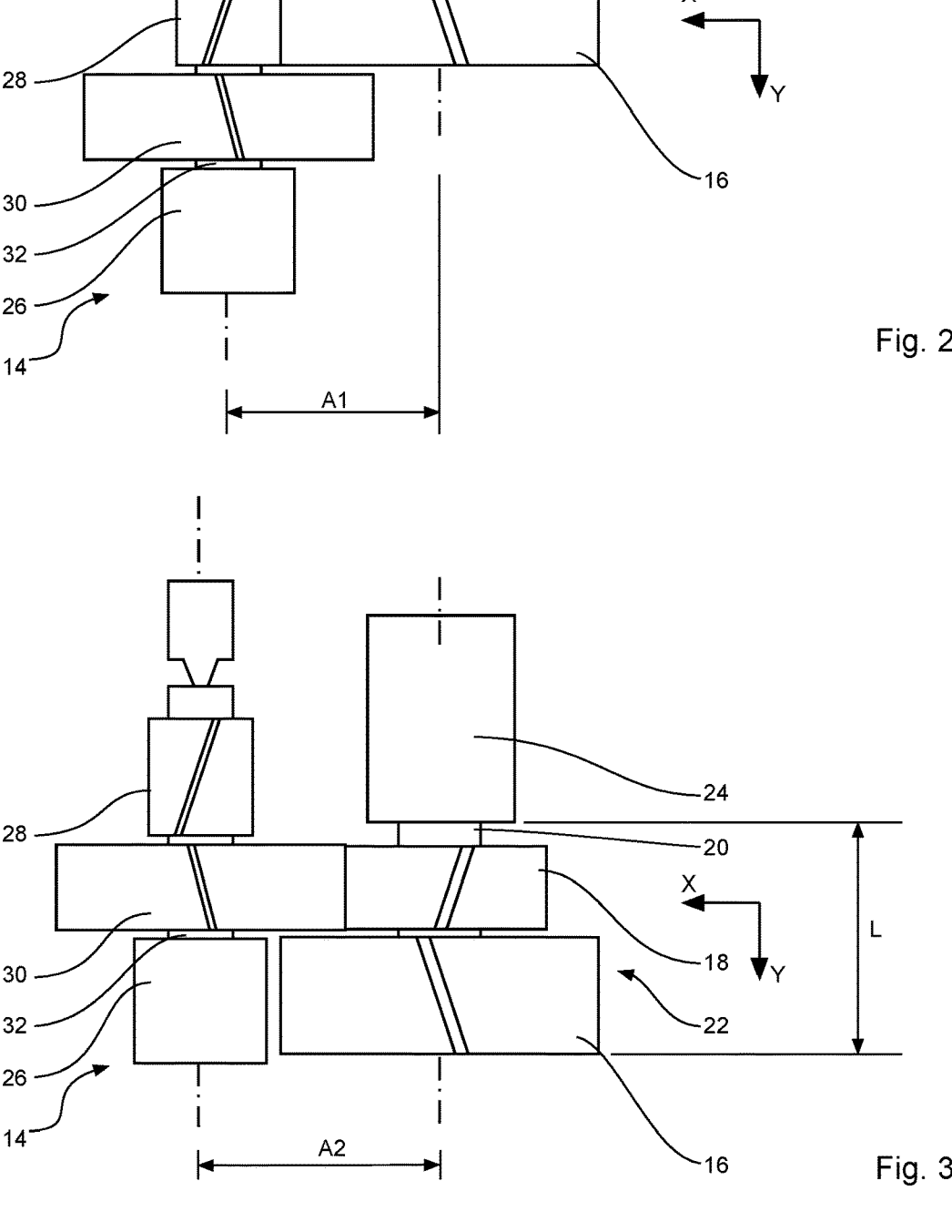
FIG. 2 shows a schematic, very simplified illustration of the roll testing machine from FIG. 1 in a first position corresponding to a first machine setting.
FIG. 3 shows a schematic, very simplified illustration of the roll testing machine from FIG. 1 in a second position corresponding to a second machine setting.

FIG. 2 shows the roll testing machine 10 in a very simplified schematic illustration.

The first spindle 12 carries a first master wheel 16 and a second master wheel 18. Therefore, both the first master wheel 16 and the second master wheel 18 are arranged simultaneously on the first spindle 12.

The first spindle 12 has a first shaft 20. The first master wheel 16 and the second master wheel 18 are clamped on the first shaft 20. The first master wheel 16 and the second master wheel 18 are therefore detachably connected to the first shaft 20 and can be removed from the first shaft 20.

The first shaft 20 has a freely protruding end section 22, wherein the first master wheel 16 and the second master wheel 18 are arranged in the area of the freely protruding end section 22 of the first shaft 20.

A freely protruding length L of the freely protruding end section 22 is 10 cm in the present case.

The first spindle 12 is associated with a first drive 24 for rotationally driving the first spindle 12.

The second spindle 14 is associated with a second drive 26 for rotationally driving the second spindle.

The roll testing machine 10 has controlled axes X, Y, which are configured, in a first machine setting, to engage the first master wheel 16 with a first gearwheel 28 to be tested (FIG. 2) and, in a second machine setting, to engage the second master wheel 18 with a second gearwheel 30 to be tested (FIG. 3).

The axes X, Y, which are shown solely as a coordinate system in the present case, represent exemplary degrees of freedom of the movement which the spindles 12, 14 have in relation to one another due to the controlled axes. The reference signs X, Y therefore represent, on the one hand, coordinate directions and, on the other hand, numerically controlled axes for displacing the spindles 12, 14 relative to one another. The corresponding linear guides or linear axes can be seen in more detail in FIG. 1.

The second spindle 14 has a second shaft 32 on which the first gearwheel 28 to be tested and the second gearwheel 30 to be tested are arranged, in the present case are clamped. The first gearwheel 28 to be tested and the second gearwheel 30 to be tested are therefore detachably and exchangeably arranged on the second shaft 32.

The roll testing machine 10 is configured to carry out a single-flank roll test and/or a double-flank roll test.

For the first machine settings, the first spindle 12 and the second spindle 14 have a center distance A1 of 145 mm. For the second machine settings, the first spindle 12 and the second spindle 14 have a center distance A2 of 160 mm.

It is apparent that all mentioned numeric values are to be viewed solely as examples and are dependent on the respective gear wheels to be tested.

Figure 4:
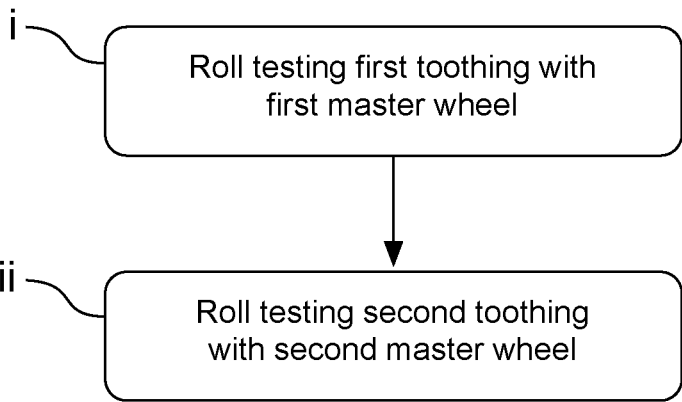
FIG. 4 shows a flow chart of a method according to the disclosure.

FIG. 4 shows a flow chart of a method according to the disclosure, which in the present case similarly represents a test cycle within the roll testing machine 10 according to the disclosure.

In a first method step (i), a roll test of the first toothing 28 to be tested is carried out by rolling with the first master wheel 16 by means of the roll testing machine 10.

In a second method step (ii), a roll test of the second toothing 30 to be tested is carried out by rolling with the second master wheel 18 by means of the roll testing machine 10.

The first master wheel 16 and the second master wheel 18 are therefore held simultaneously on the first spindle 12 of the roll testing machine 10 and the first toothing 28 to be tested and the second toothing 30 to be tested are also held simultaneously on the second spindle 14 of the roll testing machine 10. In this way, a successive testing of the first toothing 28 to be tested and the second toothing 30 to be tested is possible without refitting or re-clamping having to take place.

The first toothing 28 to be tested and the second toothing 30 to be tested can be tested in succession in a single test cycle of the roll testing machine 10, in which initially, for example, the first machine setting shown in FIG. 2 is set by means of the controlled axes X, Y in order to engage the first master wheel 16 and the first toothing 28 to be tested with one another.

Provided speeds and torques can then be set by means of the drives 24, 26 in order to test the first toothing 28 to be tested in the context of a roll test in the tooth contact rolling with the first master wheel 16.

The second machine setting shown in FIG. 3 can then be used by means of the controlled axes X, Y in order to engage the second toothing 30 to be tested with the second master wheel 18 and also to carry out a roll test.

It is apparent that the sequence of the testing can also be carried out in reverse, wherein first the second gearwheel 30 to be tested is tested and then the first gearwheel 28 to be tested is tested. It is solely important that the first spindle 18 carries two master wheels 16, 18 simultaneously and that the second spindle 14 carries two toothings 28, 30 to be tested simultaneously.

The master wheels 16, 18 have different diameters. The first master wheel 16 thus has a larger diameter than the second master wheel 18.

The toothings 28, 30 to be tested have different diameters. The first toothing 28 to be tested thus has a smaller diameter than the second toothing 30 to be tested.

After the testing of the first toothing 28 to be tested and the second toothing 30 to be tested is completed, the first toothing 28 to be tested and the second toothing 30 to be tested can be removed together with the second shaft 32 from the roll testing machine 10 and a prepared, further second shaft having correspondingly accommodated first and second further toothings to be tested can be inserted into the roll testing machine 10, in order to test these further first and second toothings to be tested by means of the roll testing machine 10 and the master wheels 16, 18. In particular, the equipping of the roll testing machine 10 with toothings to be tested can take place in an automated manner.

The two master wheels 16, 18 are each helical toothings, wherein one of the two master wheels 16, 18 is left-handed and one of the two master wheels 16, 18 is right-handed.

The two gear wheels 20, 30 to be tested are each helical toothings, wherein one of the two toothings 28, 30 to be tested is left-handed and one of two the toothings 28, 30 to be tested is right-handed.

The gear wheels 16, 18, 28, 30 are in the present case external helical-toothed spur gears.

The gear wheels 16, 18 are intended for use in a motor vehicle driven by an electric motor, such as a passenger vehicle, a truck, or the like.

The invention claimed is:

1. A roll testing machine for roll testing toothings, the roll testing machine comprising:
   a first spindle;
   a second spindle;
   a first master wheel, which is arranged on the first spindle,
   a second master wheel, which is arranged on the first spindle,
   a first gearwheel to be tested, which is arranged on the second spindle, a second gearwheel to be tested, which is arranged on the second spindle,
   wherein the first gearwheel to be tested and the second gearwheel to be tested have different diameters,
   wherein the first master wheel and the second master wheel have different diameters,
   and wherein the roll testing machine has two or more controlled axes, wherein the controlled axes are configured in a first machine setting, to engage the first master wheel with the first gearwheel to be tested and in a second machine setting, to engage the second master wheel with the second gearwheel to be tested.

2. The roll testing machine as claimed in claim 1, wherein
   the first spindle has a first shaft, wherein the first master wheel and the second master wheel are arranged on the first shaft and are clamped.

3. The roll testing machine as claimed in claim 1, wherein
   the first shaft has a freely protruding end section, wherein the first master wheel and the second master wheel are arranged in the area of the freely protruding end section of the first shaft.

4. The roll testing machine as claimed in claim 3, wherein
   a freely protruding length of the freely protruding end section is 20 cm or less.

5. The roll testing machine as claimed in claim 1, wherein
   the first spindle is associated with a first drive for rotationally driving the first spindle and/or
   the second spindle is associated with a second drive for rotationally driving the second spindle.

6. The roll testing machine as claimed in claim 1, wherein
   the second spindle has a second shaft for accommodating two gearwheels to be tested.

7. The roll testing machine as claimed in claim 6, wherein
   the first gearwheel to be tested and the second gearwheel to be tested are arranged on the second shaft, and are clamped.

8. The roll testing machine as claimed in claim 1, wherein
   the roll testing machine is configured to carry out a single-flank roll test and/or a double-flank roll test.

9. A roll testing machine, configured to carry out a method, the method including the following steps:
   roll testing a first gearwheel to be tested by rolling with a first master wheel using a roll testing machine;
   roll testing a second gearwheel to be tested by rolling with a second master wheel using the roll testing machine;
   wherein
   the first master wheel and the second master wheel are arranged on a first spindle of the roll testing machine and
   the first gearwheel to be tested and the second gearwheel to be tested are arranged on a second spindle of the roll testing machine,
   the first master wheel and the second master wheel have different diameters,
   the first gearwheel to be tested and the second gearwheel to be tested have different diameters,
   the roll testing machine has two or more controlled axes, wherein the controlled axes are configured in a first machine setting, to engage the first master wheel with the first gearwheel to be tested and in a second machine setting, to engage the second master wheel with the second gearwheel to be tested.

10. The roll testing machine as claimed in claim 9, wherein the roll testing machine has two or more controlled axes, wherein the controlled axes are configured in a first machine setting, to engage the first master wheel with a first gearwheel to be tested and in a second machine setting, to engage the second master wheel with a second gearwheel to be tested and the roll testing of the first gearwheel to be tested is carried out using the first machine setting and the roll testing of the second gearwheel to be tested is carried out using the second machine setting.

11. A method, the method including the following steps:

roll testing a first gearwheel to be tested by rolling with a first master wheel using a roll testing machine;

roll testing a second gearwheel to be tested by rolling with a second master wheel using the roll testing machine; wherein the first master wheel and the second master wheel are arranged on a first spindle of the roll testing machine and the first gearwheel to be tested and the second gearwheel to be tested are arranged on a second spindle of the roll testing machine, the first master wheel and the second master wheel have different diameters, the first gearwheel to be tested and the second gearwheel to be tested have different diameters, the roll testing machine has two or more controlled axes, wherein the controlled axes are configured in a first machine setting, to engage the first master wheel with the first gearwheel to be tested and in a second machine setting, to engage the second master wheel with the second gearwheel to be tested.

12. The method as claimed in claim 11, wherein the roll testing machine has two or more controlled axes, wherein the controlled axes are configured in a first machine setting, to engage the first master wheel with a first gearwheel to be tested and in a second machine setting, to engage the second master wheel with a second gearwheel to be tested and the roll testing of the first gearwheel to be tested is carried out using the first machine setting and the roll testing of the second gearwheel to be tested is carried out using the second machine setting.

* * * * *